Aug. 8, 1933.  J. C. PATERSON ET AL  1,921,580
MACHINE FOR STACKING AND ARRANGING BISCUITS AND THE LIKE
Filed Aug. 26, 1931  2 Sheets-Sheet 1

INVENTORS
JOHN CURRIE PATERSON
GEORGE RALPH BAKER
BY George B. Willcox
ATTORNEY

Aug. 8, 1933.        J. C. PATERSON ET AL        1,921,580
MACHINE FOR STACKING AND ARRANGING BISCUITS AND THE LIKE
Filed Aug. 26, 1931        2 Sheets-Sheet 2

INVENTORS
JOHN CURRIE PATERSON
GEORGE RALPH BAKER
BY George B Willcox
ATTORNEY

Patented Aug. 8, 1933　　　　　　　　　　　　　　　　　　　　　1,921,580

UNITED STATES PATENT OFFICE 1,921,580

MACHINE FOR STACKING AND ARRANGING BISCUITS AND THE LIKE

John Currie Paterson and George Ralph Baker, Willesden, London, England, assignors to Baker Perkins Company, Inc., Saginaw, Mich., a Corporation of New York Application August 26, 1931, Serial No. 559,477, and in Great Britain September 3, 1930

3 Claims. (Cl. 198—30)

This invention relates to the arranging and stacking of biscuits or the like and has particular reference to machines or appliances of the type wherein the biscuits or like articles (hereinafter referred to as biscuits) are transferred from one conveyor to another and arranged in defined files or lines in order to facilitate the picking up or gathering of the biscuits by hand for packing purposes.

One object of the present invention is to provide an improved method of and means for receiving biscuits fed forward, in a haphazard manner, and aligning them or arranging them more or less uniformly in defined files prior to the stacking operation.

Another object is to provide an improved and simplified mode of mounting the aligning bars which define the rows or gangways along which the biscuits proceed, so that they may readily be removed and replaced in the desired spacing according to the size or shape of biscuits being dealt with.

According to one feature of the invention, in the arranging or stacking of buscuits, the biscuits are fed to a transversely reciprocating device adapted to afford changing opportunities for the biscuits to align or arrange themselves in defined files suitable for collection or stacking.

The transversely reciprocating device may comprise a reciprocating plate having parallel partitions, the moving openings between which afford changing opportunities for the biscuits to align or arrange themselves in the defined files.

According to a further feature of the invention the pathways are defined by bars, certain of which may be readily removable and located in position by engagement of their ends with other bars or relatively fixed parts by a slotted tenon connection.

Further features of the invention will be hereinafter described and defined in the claims.

In the accompanying drawings:

Figure 3 is a diagrammatic side elevation of a unitary aligning and stacking machine.

Figure 1:
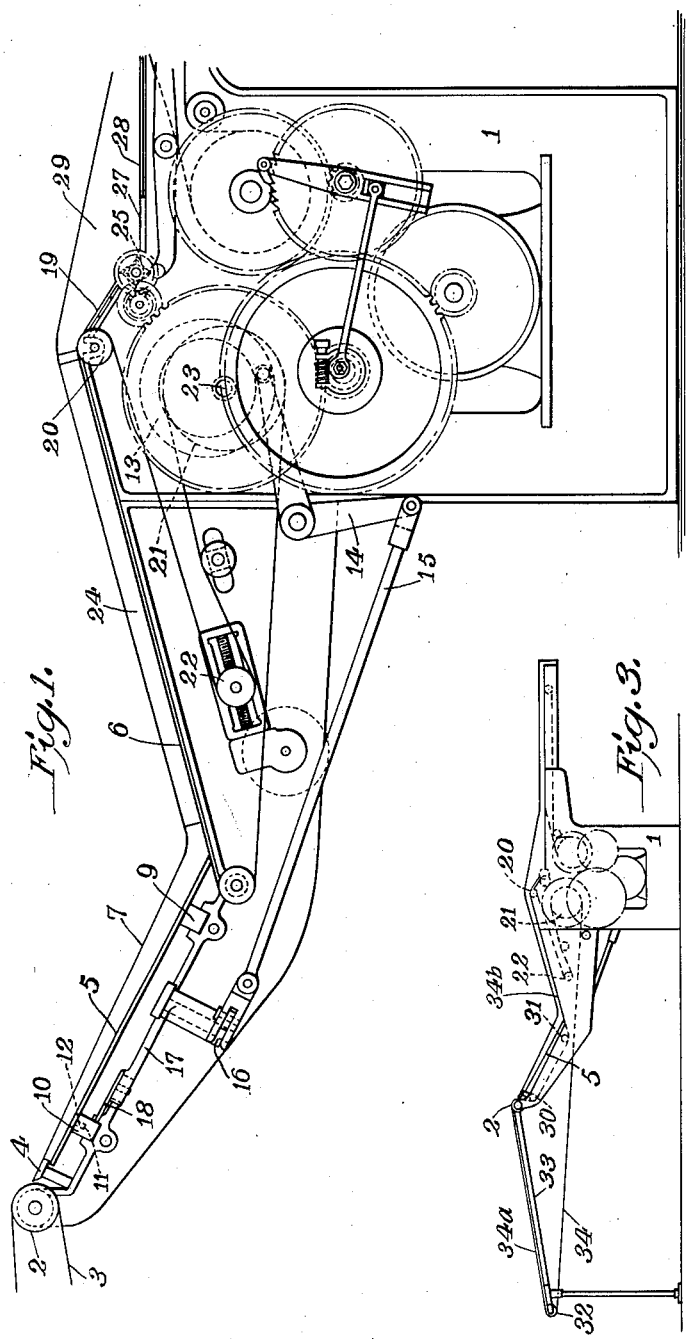
Figure 1 shows in elevation a machine according to the invention suitable for applying to the end of a continuous biscuit plant.

In carrying the invention into effect according to one convenient mode a pair of brackets or supports 1 is provided having a re-entrant angle in which the biscuit aligning means is mounted. At the outer end of the brackets a web roll 2 is mounted which is adapted to support a feeding web 3 which delivers the biscuits to the aligning and sorting means. This web may comprise the delivery web of a continuous biscuit plant receiving its drive from such plant.

The biscuits are delivered on the conveyor or web 3 in any convenient manner and may lie thereon without regard to order or alignment but preferably so that they are all face up.

The biscuits fed over the roll 2 are received upon a fixed bar or knife 4 extending across the machine, the upper surface of the bar being inclined downwardly in the direction of feed. The aligning means are disposed forwardly of this bar and comprise a downwardly inclined plate or chute 5, the surface of which at the rear edge is preferably somewhat lower than the bar adjacent thereto so as to provide an abrupt drop for the biscuits. The forward edge of the plate 5 is disposed adjacent the surface of a conveyor band 6 hereinafter referred to.

Figure 2:
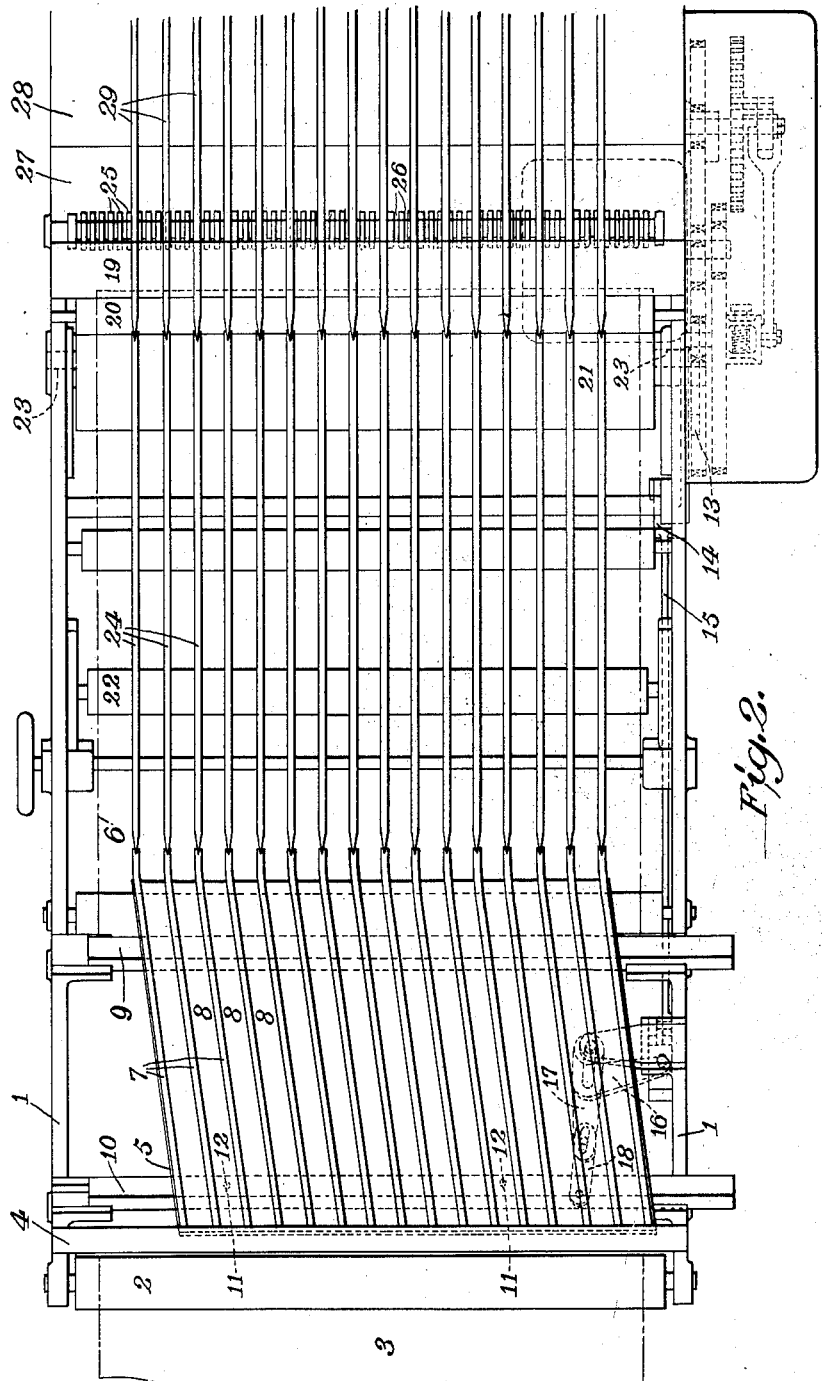
Figure 2 shows a corresponding plan.

The plate is provided with a series of splines or guide bars 7 arranged parallel to one another and forming a series of gangways of paths 8. The splines may be inclined to the direction of feed as will be seen in Figure 2, so that the leading ends are more or less in line with the rearward ends of the adjacent splines.

The upper surfaces of the splines at their rear ends are level with or slightly lower than the surface of the fixed bar 4 so that there is no obstruction to the flow of the biscuits, and their depth increases toward their forward ends, so that the gangways or paths 8 deepen in the direction of feed of the biscuits, the arrangement being such that the inclination of any biscuits which may rest on or against the splines will gradually increase so that finally they slide down into one of the pathways.

The plate 5 carrying the splines is mounted upon a pair of bars 9, 10, of which one, 9, is fixed, and the other, 10, is adapted to reciprocate transversely of the direction of the feed of the biscuits. The reciprocating bar 10 is provided with a pair of holes or recesses 11 to accommodate pins or projections 12 on the plate 5 whereby the movements of the bar are communicated to the plate. By this arrangement the plate may be readily removed and another, having differently spaced splines 7, placed in position according to the nature, size and shape of the biscuits being dealt with.

The reciprocation of the bar 10 and consequently the aligning plate 5 may be effected by any suitable means such as cam actuated levers, means preferably being included so that the amplitude of the reciprocations may be varied.

Thus a rotary cam 13 is adapted to oscillate a bell-crank lever 14 one arm of which is connected by a link 15 to a second bell-crank lever having arms 16, 17, the arm 17 having a pin and slot connection with an arm 18 secured to the bar 10. The extent of the transverse reciprocation may be equal to the pitch or distance between the axes of adjacent gangways.

Biscuits arriving at the forward end of the aligning chute are received upon the feeding lap of the conveyor 6 which delivers them over a crest and onto an inclined plate 19 down which they slide to suitable stacking means. This conveyor is provided with supporting guide rolls 20 whereby the forward lap is inclined upwardly at the desired angle, and also with driving and tensioning rolls 21, 22 respectively. The driving roll 21 is mounted on the same spindle 23 as the cam 13 so that the speed of the transverse reciprocations of the plate 5 is synchronized with the forward feed of the files of biscuits when the latter are being carried by the conveyor 6.

Splines or bars 24 are mounted above the feeding lap of the conveyor 6 so that they rest thereon or are slightly raised therefrom. The spacing of the bars conforms with that of the bars 7 whereby the biscuits will be maintained in their respective files as determined by the aligning means 5. The splines 24 are mounted in such a manner that their ends adjacent the bars 7 will partake of the reciprocations of the bars 7 as hereinafter referred to.

The stacker may comprise a rotary paddle wheel or like device having a series of radial paddles or arms 25, preferably curved on their forward faces which are adapted to receive the biscuits and cause them to be fed forward in a more or less vertical or stacked condition, each biscuit being tucked in at the rear of the preceding one. The rear faces of the paddles may be substantially radial. The arms or paddles of the wheel are separated by a series of saw cuts or spaces 26.

The stacker wheel co-operates with a comb plate 27 which is set approximately in a horizontal plane, its upper surface being disposed at or about the level of the axis of the paddle wheel. The teeth of the paddle wheel are arranged to pass downwardly through the slots in the comb plate, the plate serving to catch the biscuits and hold them on edge while the curved sides of the teeth of the paddle wheel feed them forward.

The biscuits in the stacked condition are fed forwardly by the action of the stacking wheel over the comb plate 27 onto a further plate or table 28 (the upper surface of which is level with that of the comb plate) and thence from table onto a delivery conveyor or web, not shown.

The plate or table 28 adjacent the comb plate is utilized to carry vertical division guides or fences 29 which are fixed thereto and are adapted to maintain the files of biscuits separate as they pass from the feed conveyor or web 6 over the stacking mechanism to the delivery conveyor. The plate 28 (with the associated guides) which together are referred to in the claims as a guideway element, is made removable so that another plate with guides spaced to suit the size and shape of the biscuits being stacked may be readily fixed in position. The biscuits on the delivery web are finally taken away by the operator and packed in tins or otherwise dealt with.

The guide bars or fences are provided throughout the distance between the point of delivery of the biscuit-aligning chute or plate 5 to the forward end of the conveyor which carries away the stacked biscuits, whereby the biscuits are maintained and guided along the correct files. Two series of bars are provided, the central series 29 (associated with the stacking means) fixed to the table plate 28, and constituting a second guideway element which is readily movable as described above, and the series 24 associated with the conveyor 6 which extends between the ends of the guide bars 7 and the guide bars 29. The series 24 are mounted in a readily removable manner and are preferably held in position by the engagement of their ends with the ends of the adjacent guideway elements. Thus, the bars 24 are formed wedge-shaped at one end and engage in V-grooves or notches cut in the corresponding bars 7 of the aligning device. At their other end the bars 24 are notched to receive the wedge shaped ends of the bars 29. It will be appreciated that those movable fences 24 will have a transverse vibratory or pivoting movement imparted by the reciprocation of the biscuit aligning device and for this purpose the notches are opened out or shaped so that a relatively loose fit is provided.

The loose tenon form of connection also permits the splines or bar 24 to rest freely upon the surface of the web 6.

The various fences and guide bars may be formed of spring steel or other suitable material.

In operation biscuits are fed by the conveyor 3 over the roll 2 and slide onto the inclined bar or knife 4. The biscuits sliding down the knife 4 will be delivered to the splined aligning plate 5 which owing to its reciprocation will present to the oncoming biscuits a constantly changing opportunity to arrange or align themselves in the files or spaces 8 defined by the splines 7. Moreover, any biscuits lodging on the top of the splines will automatically be pushed into a space 8 by the oncoming biscuits, since the splines 7 are inclined to the direction of feed.

When the biscuits in their various files reach the lower end of the plate or chute 5 they are received upon the conveyor band 6 and carried upwardly over the crest provided by the supporting roll 20 and thence slide down the knife plate 19 of the stacker wheel. The paddles 25 of this wheel receive the biscuits successively and cause them to stand on edge and be tucked in one behind the other. The paddles also advance or feed the biscuits in a more or less vertical position over the comb plate 27 and onto the fixed table 28 until finally they reach the discharge conveyor. This conveyor carries the stacked biscuits to a position where they are removed by hand or otherwise dealt with.

In the modified form of the machine as shown in Figure 3 which comprises a self-contained machine, the feed conveyor is replaced by a part of the feeding lap of the conveyor which delivers the aligned files of biscuits to the stacker. Beneath the aligning chute 5 guide rolls 30, 31 are provided. A third roll 32 is mounted at the outward edge of a table 33. Table 33 is pivoted at the axis of the roll 2.

The upper lap of the conveyor 34 passes over the rolls 32 and 2 and thence beneath the guide rolls 30, 31 and then upwardly over the roll 20. The return lap passes around the tensioning roll 22, the driving roll 21 and back to the guide rolls 32. The forward lap of the conveyor is thus provided with a pair of feeding sections 34a, 34b separated by a non-feeding section extending below the aligning chute 5 so that the conveyor feeds the biscuits to the aligning and file forming device and then again receives them and delivers them to the stacking device.

The table 33 is adapted to be hinged over onto the framework of the machine for moving.

It will be understood that the biscuits may be delivered to the feeding section 34a of the conveyor in any desired manner.

According to a modified arrangement of the biscuit aligning device, instead of being fixed to the plate or chute 6, the bars or splines 7 may be separate therefrom and their lower or forward ends may be fixed in position. The upper ends of the bars 7 will then be attached to a suitable reciprocating device to give the bars a pivotal movement about their lower ends. In such case the removable fences 24 would be stationary.

Having thus described our invention, what we claim and desire to secure by Letters Patent is:

1. In a machine for arranging and stacking biscuits, in combination, guideway elements spaced apart lengthwise of the machine, longitudinal partitions mounted on said guideway elements, each guideway element being removable as a unit, and loose bars intermediate the guideway elements between the ends of the partitions adapted to be detachably connected thereto by interengaging joints, said loose bars being interchangeable and adapted to different guideway elements having variously spaced partitions.

2. In a machine for arranging or stacking biscuits, guideway elements spaced apart lengthwise of the machine and comprising longitudinal partitions, a plurality of interchangeable bars supported by and resting on an endless conveyor band and positioned thereon by the engagement of their ends with the ends of said partitions in vertical tongue-and-groove joints.

3. A machine for arranging or stacking biscuits provided with a plurality of guideway elements spaced apart lengthwise of the machine and having longitudinal partitions, and loose bars intermediate the guideway elements detachably connected by means of loose tenon joints to the partitions thereof.

JOHN CURRIE PATERSON.
GEORGE RALPH BAKER.